United States Patent
Glik et al.

(10) Patent No.: US 10,397,090 B2
(45) Date of Patent: Aug. 27, 2019

(54) SYSTEM AND METHOD TO IMPLEMENT A WIRELESS SNIFFER IN NETWORKS USING A DEDICATED SNIFFER NETWORK

(71) Applicant: Intel IP Corporation, Santa Clara, CA (US)

(72) Inventors: Michael Glik, Kfar Saba (IL); Solomon B. Trainin, Haifa (IL); Daniel Cohn, Oakland, CA (US); Izoslav Tchigevsky, Portland, OR (US); Alexander Sirotkin, Tel-Aviv (IL)

(73) Assignee: Intel IP Corporation, Santa Clara, CA (US)

( * ) Notice: Subject to any disclaimer, the term of this patent is extended or adjusted under 35 U.S.C. 154(b) by 131 days.

(21) Appl. No.: 15/392,558

(22) Filed: Dec. 28, 2016

(65) Prior Publication Data
US 2018/0183702 A1    Jun. 28, 2018

(51) Int. Cl.
| | |
|---|---|
| H04L 29/06 | (2006.01) |
| H04L 12/751 | (2013.01) |
| H04W 24/08 | (2009.01) |
| H04W 84/12 | (2009.01) |
| H04W 88/08 | (2009.01) |
| H04W 88/12 | (2009.01) |

(52) U.S. Cl.
CPC ............ *H04L 45/02* (2013.01); *H04W 24/08* (2013.01); *H04W 84/12* (2013.01); *H04W 88/08* (2013.01); *H04W 88/12* (2013.01)

(58) Field of Classification Search
CPC ...................................................... H04L 45/02
See application file for complete search history.

(56) References Cited

U.S. PATENT DOCUMENTS

| | | | |
|---|---|---|---|
| 7,447,184 B1 | 11/2008 | Kharvandikar et al. | |
| 2004/0059963 A1* | 3/2004 | Simonnet | H04B 3/542 714/47.1 |
| 2006/0227714 A1* | 10/2006 | Griffin | H04L 43/50 370/241 |

(Continued)

FOREIGN PATENT DOCUMENTS

WO    2018125458    7/2018

OTHER PUBLICATIONS

"International Application Serial No. PCT US2017 063409, International Search Report dated Mar. 7, 2018", 4 pgs.

(Continued)

*Primary Examiner* — Adnan M Mirza
(74) *Attorney, Agent, or Firm* — Schwegman Lundberg & Woessner, P.A.

(57) ABSTRACT

An apparatus comprises a memory and processing circuitry that are configured to implement a first network control protocol (NCP) MAC layer configured to handle MAC layer communications of the first NCP, and sniffer edge circuitry. The sniffer edge circuitry is configured to communicate with the first NCP MAC layer and a second NCP MAC layer and to capture events related to second NCP (WiGig) communications. These captured events are communicated over a dedicated sniffer network, and packet contents communicated between the second NCP MAC layer and the second NCP stack are secure from the sniffer edge circuitry. The apparatus receives a distributed common time reference and uses this to timestamp the captured events.

25 Claims, 8 Drawing Sheets

(56) References Cited

U.S. PATENT DOCUMENTS

2007/0091934 A1    4/2007   Myles et al.
2015/0131528 A1    5/2015   Abraham et al.
2016/0112214 A1    4/2016   Currivan et al.

OTHER PUBLICATIONS

"International Application Serial No. PCT US2017 063409, Written Opinion dated Mar. 7, 2018", 11 pgs.

Koutsonikolas, Dimitrios, "TDM MAC Protocol Design and Implementation for Wireless Mesh Networks", ACM CoNEXT 2008, Madrid, Spain, [Online] Retrieved from the internet:https: www.cse.buffalo.edu faculty dimitrio publications tdm.pdf, (Dec. 12, 2008), 12 pgs.

\* cited by examiner

SYSTEM AND METHOD TO IMPLEMENT A WIRELESS SNIFFER IN NETWORKS USING A DEDICATED SNIFFER NETWORK

TECHNICAL FIELD

The present disclosure relates to monitoring and recording events (such as presence, connection, disconnection, data traffic, etc.) in a network environment by a sniffer, which is an entity that monitors and records such events on one or more computer networks that it has visibility to.

BACKGROUND

A network sniffer monitors and network environment events on one or more visible computer networks. Those events may then be displayed to a network specialist for analysis, and may include information for recorded events, such as event type, recording time, packet header, non-encrypted packet payload, analysis of protocol flows, timing, etc. This information allows the specialist to find and repair network problems and to improve network performance by changing the network topology and configuration. A wireless sniffer may typically be implemented as a passive receiver equipped with an omnidirectional antenna, and such a wireless sniffer may monitor and record wireless events belonging to all networks in range.

Some industry standards require devices to have similar environmental measurement capabilities by user equipment (UE) devices. For example, the $3^{rd}$ Generation Partnership Project (3GPP) defines a way to minimize drive tests by gathering network environment information from phones. Some large enterprises may use network environment information collected by client computers to optimize their networks. This implementation is relevant for wireless technologies where an appropriately placed receiver with an omnidirectional antenna may be assumed to be able to receive and decode all transmissions from devices in range.

In wireless technologies where transmit beamforming is used, such as Wi-Fi SU/MU-MIMO and WiGig, the above implementation may not be feasible, since an omnidirectional receiver, no matter how centrally located, may not be assumed to receive and decode transmissions of other devices in range. This is relevant in WiGig networks, where propagation properties are very similar to light propagation, and therefore, all parts of sent packets are beamformed for directivity.

To overcome this problem, multiple sniffers may be used. However, this creates a further problem in the synchronizing of data from different sniffers to create a coherent picture to the specialist. The timestamp from monitored network events are problematic because packets may belong to different networks and hence have a different time base.

DETAILED DESCRIPTION

The following is a detailed description of various configurations depicted in the accompanying drawings. However, the amount of detail offered is not intended to limit anticipated variations of the described configurations; to the contrary, the claims and detailed description are to cover all modifications, equivalents, and alternatives falling within the spirit and scope of the present teachings as defined by the claims. The detailed descriptions below are designed to make such configurations understandable to a person having ordinary skill in the art.

In a general sense, according to particular configurations, an additional network may be introduced to create high resolution common timeline to synchronize between network-related events happening in independent networks with different timelines and different time bases. This may aid in making networking events more visible in directional wireless networks, and improving network deployment and configuration testing by ISPs and other network owners.

Figure 1A:
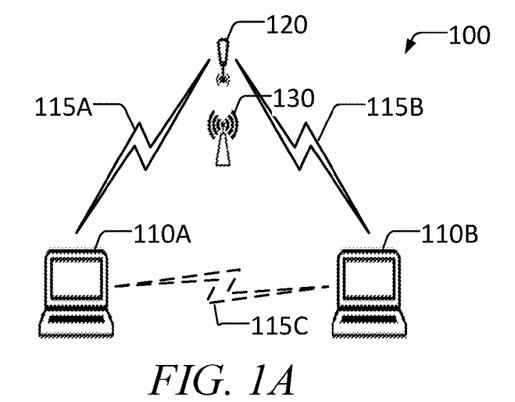
FIGS. 1A-1D are pictorial diagrams illustrating use of a single sniffer in a network configuration to detect events, in accordance with some aspects of the inventive subject matter.

FIGS. 1A-1D are pictorial diagrams illustrating use of a single sniffer in a network configuration to detect events. These figures emphasize the flaw in a single sniffer approach for wireless directional networks, where nodes may not only talk, for example, to personal basic service set (PBSS) control point/access point (PCP/AP), but also directly with each other using directional links. The networked system 100 may comprise, for example, two networked wireless devices 110a, 110b (or stations (STAs)) wirelessly connected to an access point 120. Communications between these three devices may be accomplished by three separate wireless links. A first wireless link 115a connects a first wireless device 110a to the access point; a second wireless link 115b connects a second wireless device 110b to the access point 120; and a third wireless link 115c connects the first wireless device 110a to the second wireless device 110b. As is shown in FIG. 1A, a sniffer 130 is located near the access point 120. As a result, the sniffer 130 is able to hear communications transmitted across the first wireless link 115*a* and the second wireless link 115*b* (indicated in FIG. 1A by solid lines for the links 115*a*, 115*b*). However, the sniffer 130 is not located near the third wireless link 115*c*, and is thus not able to hear communications transmitted across this link (indicated in FIG. 1A by dashed lines for the link 115*c*) (in the remaining FIG. 1*x* figures, solid lines indicate links that the sniffer can hear, dashed lines indicate links that the sniffer cannot hear, and dashed-dot lines indicate links that the sniffer can hear only limited information, e.g., control physical layer (PHY) and low multipoint communication service layer (MCS), or not hear any communications at all).

Figure 1B:
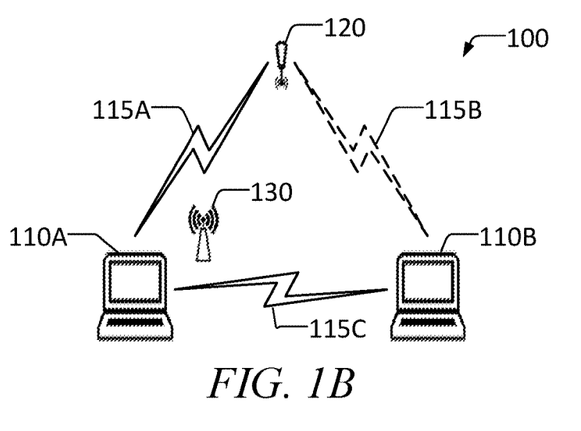
Figure 1C:
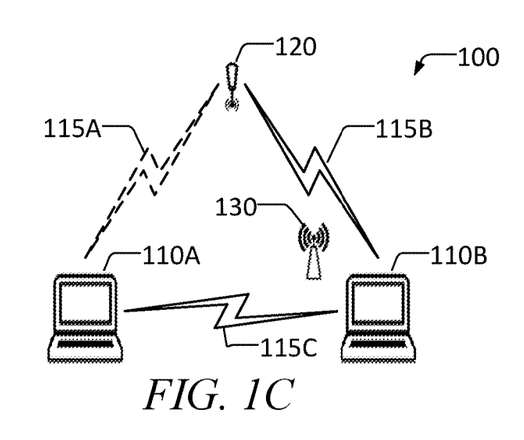
Figure 1D:
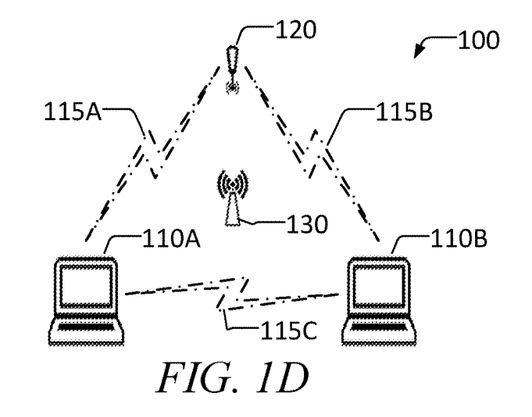

In FIG. 1B, where the components are the same as those in FIG. 1A, described above, the sniffer 130 has been moved closer to the first wireless device 110*a*. As a result, the sniffer 130 is able to hear the communications over the first wireless link 115*a* and the third wireless link 115*c*, but not the second wireless link 115*b*. In FIG. 1C, where the components are the same as those in FIG. 1A, described above, the sniffer 130 has been moved closer to the second wireless device 110*b*. As a result, the sniffer 130 is able to hear the communications over the second wireless link 115*b* and the third wireless link 115*c*, but not the first wireless link 115*a*. In FIG. 1D, the sniffer 130 is located in a central location relative to the computer devices 110 (reference numeral extensions here and below may be eliminated when referring to like elements collectively or one representative element) and the access point 120. In this case, the sniffer 130 can only hear, e.g., the control PHY and low MCS communications or nothing at all on the links 115.

Figure 2A:
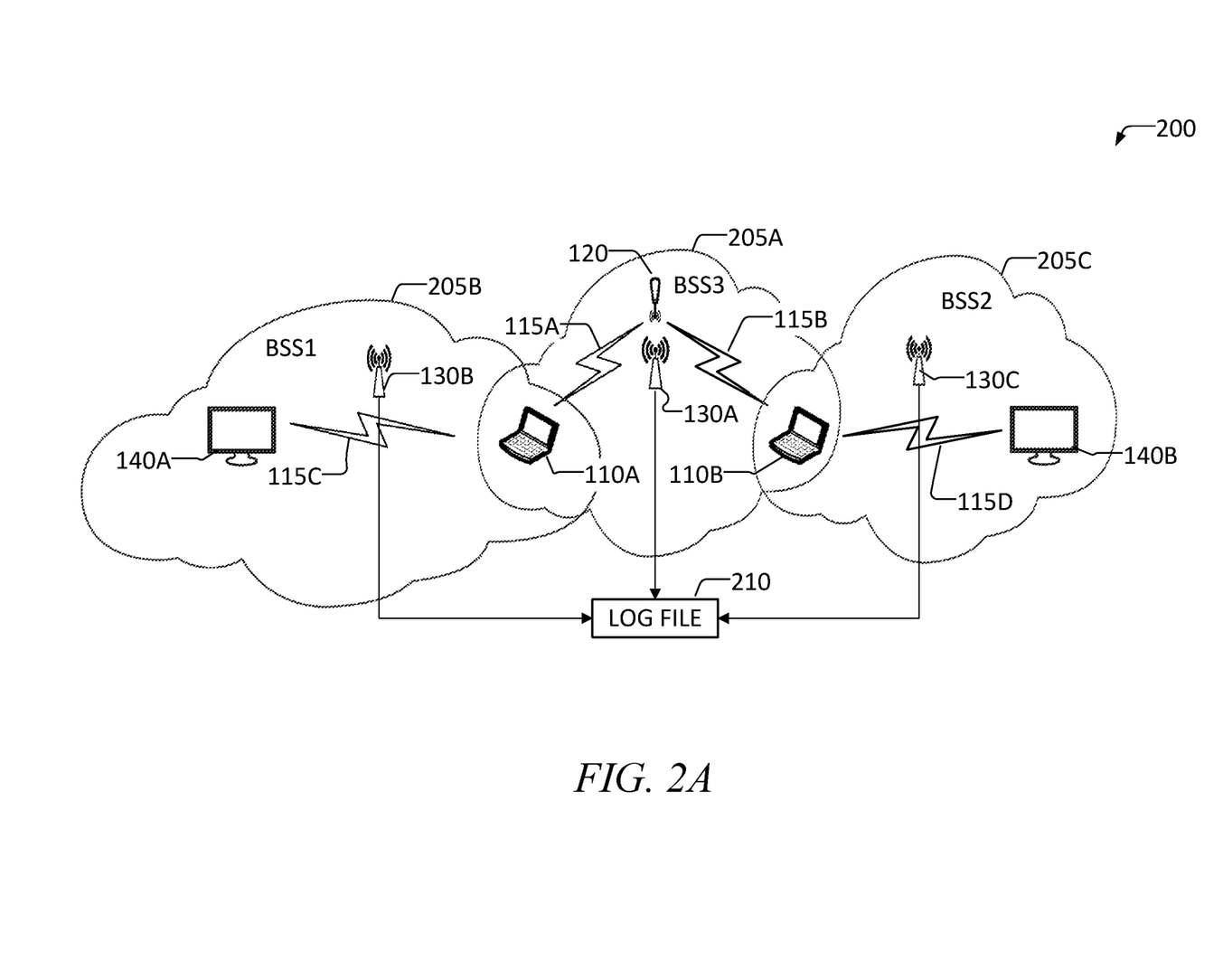
FIG. 2A is a pictorial diagram that illustrates the problem with an uncoordinated multiple sniffer solution with centralized merge of logged events, in accordance with some aspects of the inventive subject matter.

FIG. 2A is a pictorial diagram that illustrates the problem with an uncoordinated multiple sniffer solution with centralized merge of logged events. A multiple network architecture 200 comprises, e.g., three networks: BSS3 205*a*, BSS1 205*b*, and BSS2 205*c*. Communications in the first network BSS3 205*a* between the first and second computer devices 110*a*, 110*b* to the access point 120 via the respective first 115*a* and second 115*b* wireless links operate similarly to the description above with respect to FIG. 1A. A first sniffer 130*a* is located near the first 115*a* and second 115*b* wireless links and is able to receive communications from them. In addition, the first sniffer 130*a* communicates with a log file 210, discussed in more detail below.

FIG. 2A further shows communications in the second network BSS1 205*b* that includes a third communications link 115*c* between the first wireless device 110*a* and a first wireless docking station 140*a* that has an associated second sniffer 130*b* near it. This second sniffer 130*b* also communicates with the log file 210. Finally, FIG. 2A shows communications in the third network BSS2 205*c* that includes a fourth communications link 115*d* between the second wireless device 110*b* and a second wireless docking station 140*b* that has an associated third sniffer 130*c* near it. This third sniffer 130*c* also communicates with the log file 210.

The log file 210 may collect offline logs or log entries from the three sniffers 130. However, the log entries originating from each sniffer 130 has an independent clock and are thus the times and respective time stamps of the entries are not synchronized with one another. A specialist reviewing the log entries will not be able to correlate events originating from the multiple sniffers 130.

Figure 2B:
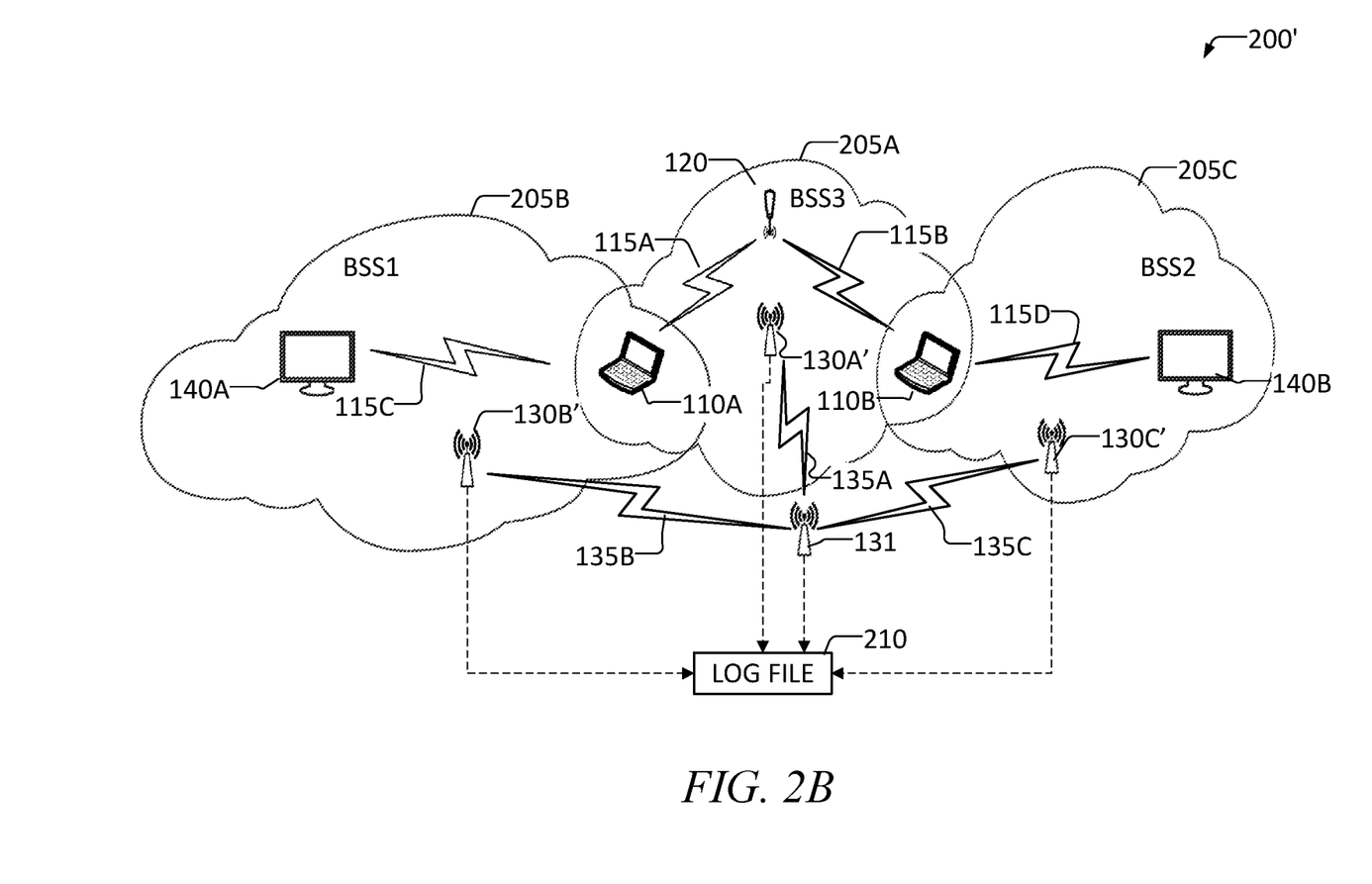
FIG. 2B is a pictorial diagram that illustrates a coordinated multiple sniffer solution in which "sniffer edges" are provided as separate sniffer entities, in accordance with some aspects of the inventive subject matter.

FIG. 2B is a pictorial diagram that illustrates a coordinated multiple sniffer network solution 200' in which "sniffer edges" 130' are provided as separate sniffer entities. The sniffer edges 130' are unaware of an actual direction the devices are communicating that may require having a sniffer edge in proximity of each device to compensate for a lack of receiving antenna gain. The sniffer edge is an entity that can collect the data from air interface. The sniffer concentrator is an entity connected (through the dedicated or network in use) to all (not necessarily directly) sniffer edges and is able to combine, sort and process data collected by sniffer edges. In one configuration, any physical node can be either edge or concentrator or both.

This solution may work for AP's that are in a static position, but make it more problematic to collect transmissions of mobile devices. One solution to the directional unawareness may be to sweep sectors of the sniffer edge's receive phase array until energy is detected and then keep the sector to receive continuation of the transaction. At the beginning of the process, the sniffer may operate in a non-directional mode of operation, such as a pseudo-omni mode (sweeping between the sectors continuously, creating an omni effect). Once the best sector (the one with the strongest signal) is detected, the sniffer may lock on this direction and operate in a directional mode of operation.

The multiple network architecture 200' of FIG. 2B comprises components and configurations similar to those discussed above with respect to FIG. 2A. However, this network architecture 200' has the following differences. It utilizes a system and method that combines multiple physical sniffers 130' and a seamless user experience by utilizing a distributed sniffer (DS) and a sniffer network. A DS may be comprised of multiple sniffer edge (SE) agents and/or nodes 130*a'*, 130*b'*, and 130*c'*, and a sniffer concentrator (SC) 131 that form a dedicated sniffer network and act as single sniffer to the specialist.

In the examples of FIGS. 2A and 2B, a WiGig (for example, using the IEEE 802.11ad standard (publication ISO/IEC/IEEE 8802.11 Amendment 3 published Mar. 15, 2014)) network is considered in which the computer devices 110, the access point 120 and the docking stations 140 may communicate with each other using a WiGig connection. This is by way of example only, and any wireless communication protocol may be considered as well. In the example shown in FIG. 2B and in a WiGig configuration, all of the sniffers 130', 131 may be connected in a non-WiGig (e.g., Wi-Fi) network—in general, according to various configurations, sniffers can use any type of network for their interconnection.

The SC 131 may be responsible for creating a common time reference and distributing it to all SEs 130 during, for example, an initialization of the SC 131 or a respective SE 130. In one configuration, any SE 130 may act as an SC 131 for flexibility. This could be done via, for example, administrative configuration according to a logical partitioning, or any other criteria. The SEs 130 may be responsible for collecting relevant events from monitoring their respective link 115, such as information related to their local media access control (MAC) entity, and marking the events with a timestamp synchronized to an absolute time reference provided by the SC 131. The SEs 130 may also be responsible for providing time stamped logs to the SC 131, either in real time or as part of a post processing, when the specialist signals an end of a sniffing task by sending a request that is a received request signal. The SC 131 may be responsible for combining logs or log entries from all SEs 130, merging them using the common timestamps, and presenting the results to the specialist as a single log file in chronological order.

This approach provides an efficient sniffer configuration for networks with directive RF signal distribution patterns since multiple sniffers may be used. With regard to a time reference that may be used for event synchronization solutions other than Wi-Fi, such as with the Global Positioning System (GPS) or Long Term Evolution (LTE) system, these solutions are limited either due to lack of coverage indoors (as with GPS) or a lack of support in the installed base of devices, like notebooks (as with LTE). The use of Wi-Fi described herein is adequate for most phone, tablet, and notebook devices. This solution may provide a one microsecond resolution for time stamping for the sniffing, which should be more than adequate given that the network time protocol is limited to about one millisecond of resolution.

In another configuration, referred to herein as a minimization of drive tests (MDT) example, instead of deploying a dedicated sniffer device, it may be possible to integrate the sniffer agent (or some variant of it) in the end device. In this approach, the sniffer agent may be a sniffer software block that is integrated into the wireless operational stack within end devices. The advantage of this approach is low cost and ability to analyze data flows operated in very high modulations on directed links.

Figure 3A:
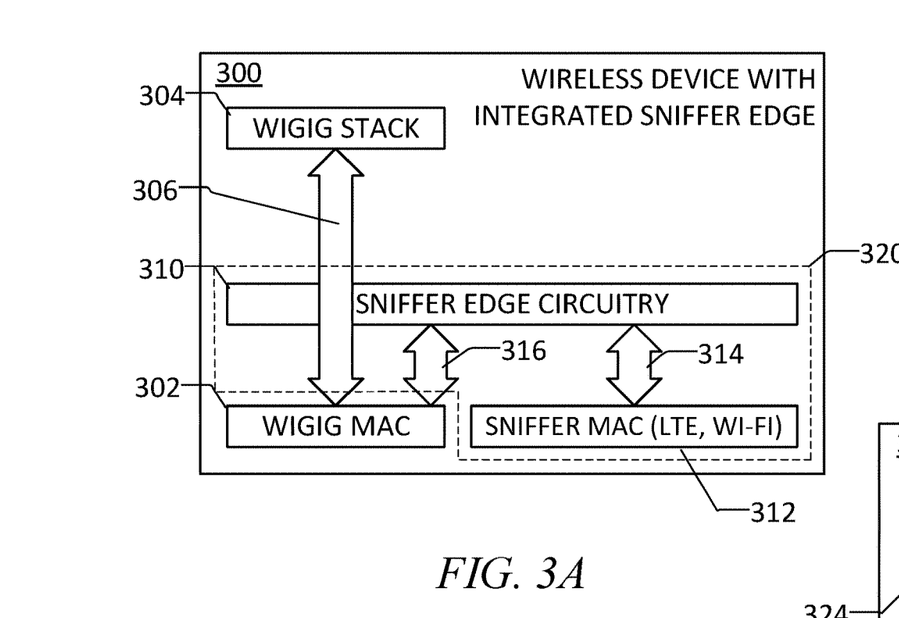
FIG. 3A is a block diagram that illustrates an example architecture for such a wireless device with an integrated sniffer edge, in accordance with some aspects of the inventive subject matter.

FIG. 3A is a block diagram that illustrates an example architecture for such a wireless device 300 with an integrated sniffer edge. The device 300 includes the normal WiGig MAC layer communications protocol handler 302 as well as the remaining WiGig communications stack 304 to which packets may be sent via a WiGig link 306. For security and privacy reasons, it may be undesirable to have integrated sniffer edge circuitry 310 capture actual packets communicated between the WiGig MAC layer communications protocol handler 302 and higher level layers of the communication stack 304. The sniffer edge circuitry 310 may contain a higher level communications stack (not shown) similar to the WiGig stack 304. Instead of capturing packets, the sniffer edge circuitry 310 may capture certain events through the sniffer edge to WiGig link 316—via a separate sniffer MAC layer communications protocol handler 312 over a sniffer MAC link 314, and/or from the WiGig MAC layer communications protocol handler 302—that may be of interest for network operators, based on, for example, the configuration of the device 300. To further improve security and privacy, such logged events may be stripped of information that may be traced to an end user. One possible example of such an event of interest may be, "WiGig coverage is below certain threshold". Other events may also be defined, such as link quality, interference, and a change in network topology.

This approach may be used for network planning and interference analysis by a network administrator, for example, in 5G or LTE networks where different types of technologies may be combined into a single network to enhance the user experience. For example, an operator deploying Enhanced LTE WLAN Aggregation (eLWA) with WiGig may use this feature to detect coverage holes. This may be implemented using certain enhancements for the LTE Minimization of Drive Tests (MDT) feature (tests that use standard mobile devices for limited network testing), and to support WLAN and WiGig related events and metrics. MDT, defined in the 3GPP TS 37.320, Release 13.1.0, published Mar. 30, 2016, incorporated by reference herein, allows the network to configure the UE to log certain measurements, along with location, timestamp and other relevant information. MDT measurement collection may also be enhanced to log WLAN and WiGig measurements, such as a received signal strength indication (RSSI).

Figure 3B:
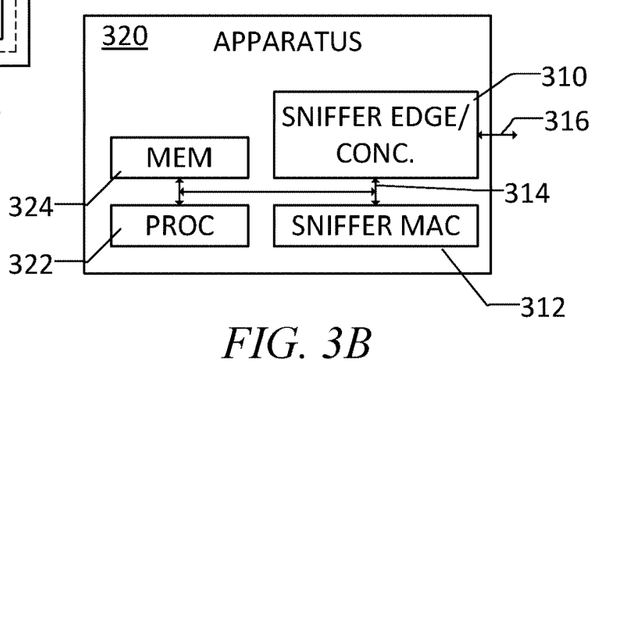
FIG. 3B is a block diagram that illustrates an example architecture for an apparatus that may be used with an integrated sniffer edge, in a sniffer edge and/or a sniffer concentrator, in accordance with some aspects of the inventive subject matter.

FIG. 3B is a block diagram of an apparatus 320 that may be part of the integrated sniffer edge device 300 shown in FIG. 3A. This apparatus 320 may be implemented as hardware or software circuitry to include the logic described above. In addition to comprising the sniffer edge circuitry 310, the sniffer MAC 312, the sniffer MAC link 314, and the sniffer edge to WiGig link 316, as described above, the apparatus 320 may further comprise a processor (or processor circuitry) 322 and memory 324 that may contain instructions that are executable on the processor 322. The sniffer edge circuitry 310 may be a part of the processor circuitry 322. The apparatus 320 may be configured as a single chip or spread across a plurality of physical devices. The apparatus 320 may also be usable in a dedicated sniffer device, such as the sniffer edge and sniffer concentrator described above. When the apparatus is used in a dedicated sniffer device, the sniffer edge to WiGig link 316 may include an antenna capable of receiving WiGig transmissions. The sniffer edge/concentrator 310, as illustrated in FIG. 3B, may be implemented as a dedicated sniffer concentrator (as described above), or it may be adaptable to take on a role as a sniffer edge and a sniffer concentrator, depending, e.g., on a command it receives instructing it of its role.

Figure 4:
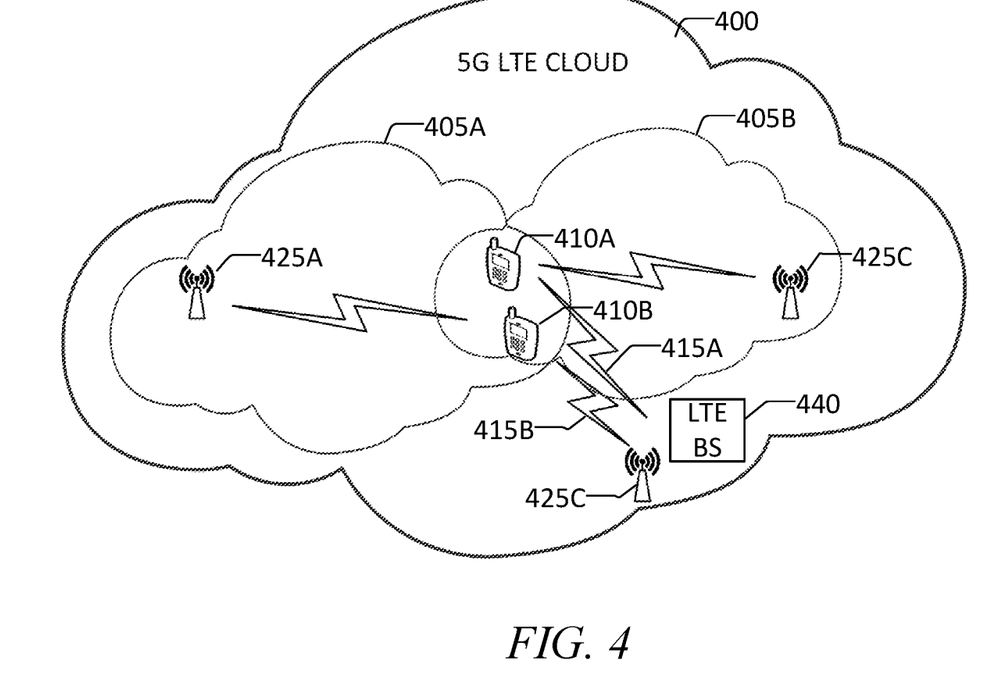
FIG. 4 is a pictorial diagram that illustrates one use case example in a 5G LTE cloud which two devices experience interference and provide their error indications through respective LTE links to a network management entity via an LTE base station, in accordance with some aspects of the inventive subject matter.

FIG. 4 is a pictorial diagram that illustrates one use case example in a 5G LTE cloud 400 in which two devices (which may be phones 410a, 410b) experience interference and provide their error indications through respective LTE links 415a, 415b to a network management entity via an LTE base station 440. However, since the two devices 410a, 410b are associated to two different WiGig networks 405a, 405b, respectively, they do not share the same time base for event timestamps. Upon receiving an alert related to the interference, the network administrator may activate sniffer entities on each of the devices (as illustrated, for example, in FIG. 3, but not shown in FIG. 4) through an LTE control interface and collect the correlated information. Based on the correlated information, the devices may have their communications be rerouted from a current hotspot 425c on which they are experiencing the interference, to other hotspots—as shown, the first device 410a to a first alternate hotspot 425a, and the second device 410b to a second alternate hotspot 425b. In this case, the LTE base station 440 may serve as the sniffer concentrator while the phones 410a, 410b serve as the sniffer edges—this may be designated by a network administrator or according to some other criteria.

Figure 5:
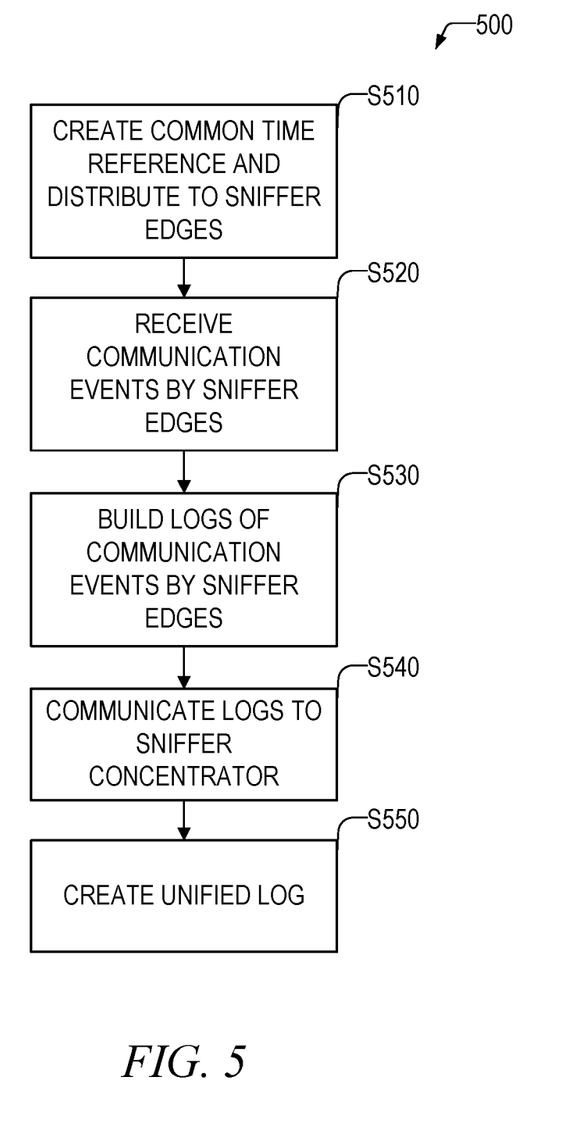
FIG. 5 is a flowchart illustrating a basic method of operation for the sniffer system, in accordance with some aspects of the inventive subject matter.

FIG. 5 is a flowchart illustrating a basic method of operation 500 for the sniffer system. Initially, in operation S510, a common time reference may be created or generated by the sniffer concentrator and communicated to the sniffer edges. The sniffer edges may then synchronize their own clocks to this common time reference. The sniffer edges receive, in operation S520, communication events occurring in the network and save these events, building, in operation S530, logs of the communication events. These events may be time stamped with an absolute time and based on the common time reference received. These logs may then be communicated, in operation S540, to the sniffer concentrator, and the sniffer concentrator may, in operation S550, create a unified log from the multiple logs received by the sniffer edges which may order the entries chronologically. One possible overall effect is that the combined sniffer concentrator and sniffer edges may be viewed externally as a single sniffer, but that has far more reach than a single physical sniffer device.

To describe some configurations in greater detail, reference is made to examples of hardware structures and interconnections usable in the designs of the present disclosure.

Figure 6:
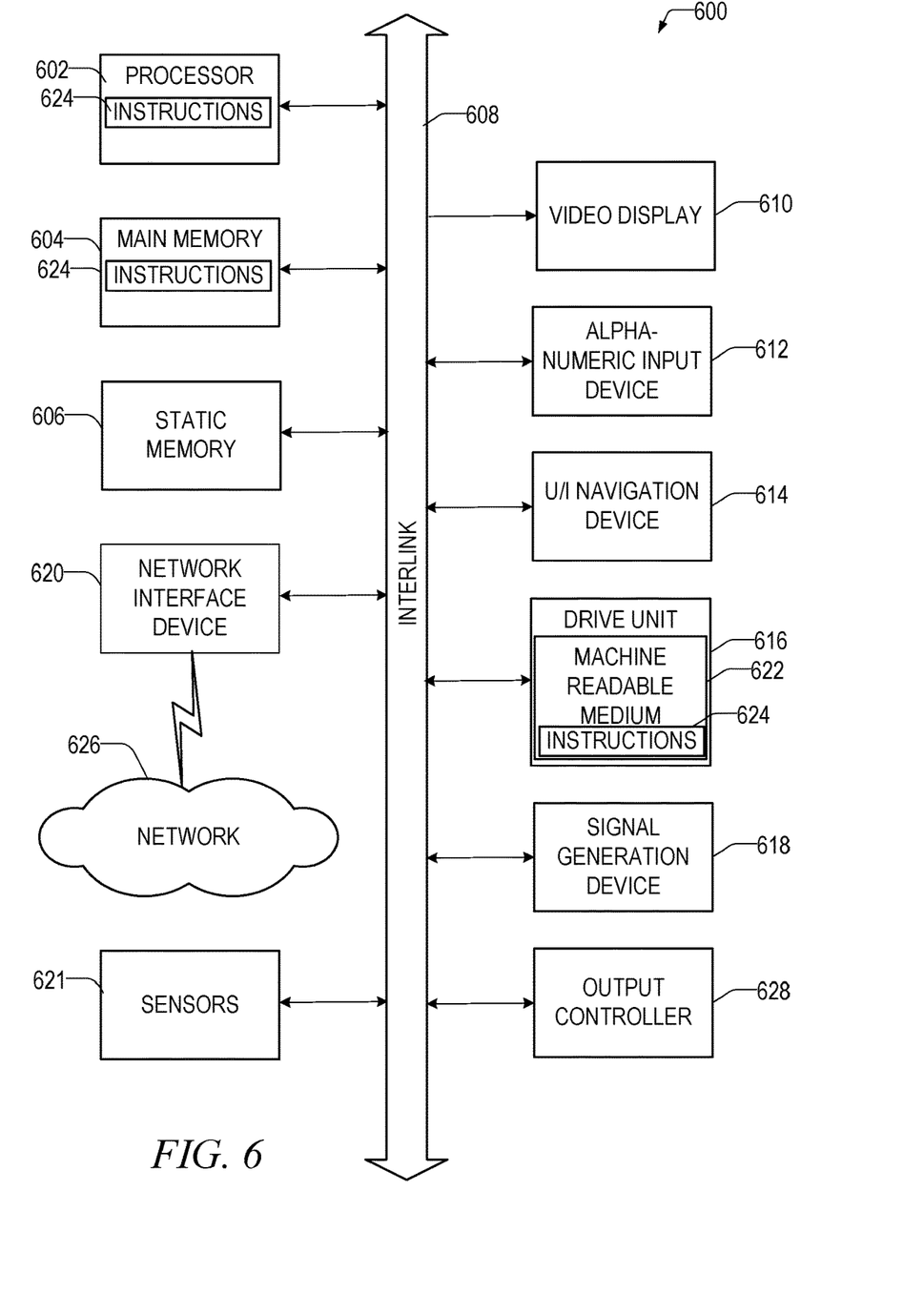
FIG. 6 is a block diagram illustrating a machine that may be a computer on which various processes described herein may be performed, in accordance with some aspects of the inventive subject matter.

FIG. 6 is a block diagram illustrating a machine that may be a computer on which various processes described herein may be performed. The machine (e.g., computer system) 600 may include a hardware processor 602 (e.g., a central processing unit (CPU), which may be an implementation of the processor 322 discussed above, a graphics processing unit (GPU), a hardware processor core, or any combination thereof), a main memory 604 and a static memory 606, which may be an implementation of the memory 324 discussed above, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example described herein, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB)), parallel, or other wired or wireless (e.g., infrared (IR), near field communication (NFC), etc.) controller connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over the communications network 105 using a transmission medium via the network interface device 620. The term "transmission medium" is defined herein to include any medium that is capable of storing, encoding, or carrying instructions for execution by the machine, and includes digital or analog communications signals or other medium to facilitate communication of such software.

The machine 600 may communicate with one or more other machines 600 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 600. In an example, the network interface device 620 may include one or more physical jacks (e.g., Ethernet, coaxial, or phone jacks) or one or more antennas to connect to the communications network 626.

In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

A wide variety of computing devices may constitute a machine 600, as described herein. The following list includes a variety of devices that may fit the definition of a machine 600: a personal data assistant (PDA), a cellular telephone, including a smartphone, a tablet computing device, a laptop computer, a desktop computer, a workstation, a server computer, a mainframe computer, and the like.

Figure 7:
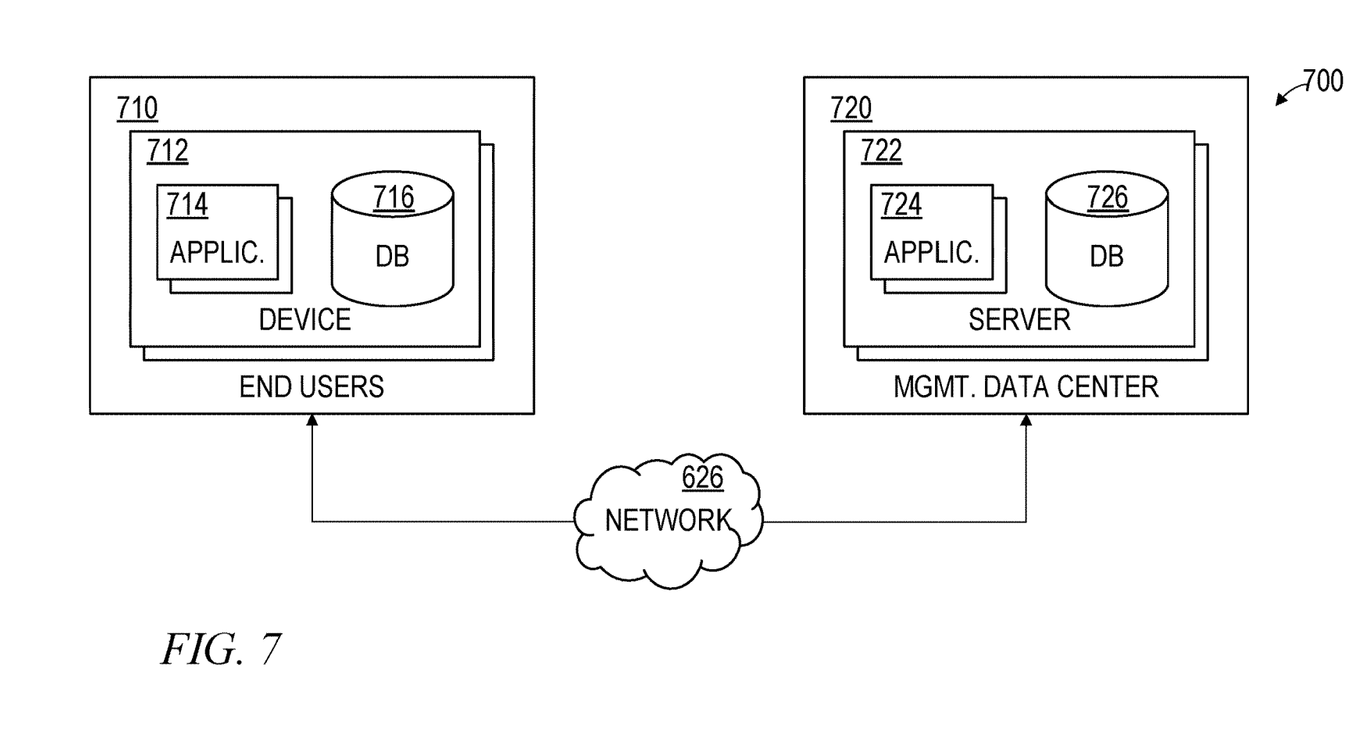
FIG. 7 is a block diagram of a network distributed system that may include a client-server architecture or cloud computing system, in accordance with some aspects of the inventive subject matter.

FIG. 7 is a block diagram of a network distributed system 700 that may include a client-server architecture or cloud computing system. Distributed system 700 may have one or more end users 710. An end user 710 may have various computing devices 712, which may be machines 600 as described above. The end-user computing devices 712 may comprise applications 714 that are either designed to execute in a stand-alone manner, or interact with other applications 714 located on the device 712 or accessible via the network 626. These devices 712 may also comprise a data store 716 that holds data locally, the data being potentially accessible by the local applications 714 or by remote applications.

The system 700 may also include one or more management data centers 720. A data center 720 may be a server 722 or the like associated with a business entity that an end user 710 may interact with. The business entity may be a computer service provider, as may be the case for a cloud services provider, or it may be a consumer product or service provider, such as a retailer. The data center 720 may comprise one or more applications 724 and databases 726 that are designed to interface with the applications 714 and databases 716 of end-user devices 712. Data centers 720 may represent facilities in different geographic locations where the servers 722 may be located. Each of the servers 722 may be in the form of a machine(s) 600.

The end-user devices 712 and data center servers 722 may be configured to connect with each other via the network 626, and access to the network by machines may be made via a common connection point or different connection points, e.g. a wireless connection point and a wired connection. Any combination of common or different connections points may be present, and any combination of wired and wireless connection points may be present as well. The network 626, end users 710, and data centers 720 may include network hardware such as routers, switches, load balancers and/or other network devices.

Other implementations of the system 700 are also possible. For example, devices other than the client devices 712 and servers 722 shown may be included in the system 700. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 722.

For the purposes of promoting an understanding of the principles of this disclosure, reference has been made to the various configurations illustrated in the drawings, and specific language has been used to describe these configurations. However, no limitation of the scope of the inventive subject matter is intended by this specific language, and the inventive subject matter should be construed to encompass all aspects and configurations that would normally occur to one of ordinary skill in the art. The configurations herein may be described in terms of functional block components and various processing steps. Such functional blocks may be realized by any number of components that perform the specified functions. The particular implementations shown and described herein are illustrative examples and are not intended to otherwise limit the scope of the inventive subject matter in any way. The connecting lines, or connectors shown in the various figures presented may, in some instances, be intended to represent example functional relationships and/or physical or logical couplings between the various elements. However, many alternative or additional functional relationships, physical connections or logical connections may be present in a practical device. Moreover, no item or component is essential unless the element is specifically described as "essential" or "critical". Numerous modifications and adaptations will be readily apparent to those skilled in this art.

EXAMPLES

Example 1 is an apparatus of a wireless network device, the apparatus comprising: memory; and processing circuitry, configured to: implement a first network control protocol (NCP) MAC layer of the apparatus configured to handle MAC layer communications of the first NCP; and sniffer edge circuitry configured to: communicate with the first NCP MAC layer and a second NCP MAC layer of the apparatus, to capture events related to second NCP communications; communicate the captured events over a dedicated sniffer network, wherein packet contents communicated between the second NCP MAC layer and the second NCP stack are secure from the sniffer edge circuitry; receive a distributed common time reference from a sniffer concentrator during an initialization of the sniffer edge circuitry; and timestamp the captured events based on the received distributed common time reference to enable synchronization of the captured events by the sniffer concentrator.

In Example 2, the subject matter of Example 1 optionally includes ad WiGig network.

In Example 3, the subject matter of Example 2 optionally includes ad WiGig network is a Wi-Fi network.

In Example 4, the subject matter of any one or more of Examples 1-3 optionally include wherein the sniffer edge circuitry is further configured to transmit timestamped logs comprising the timestamped captured events to a sniffer concentrator over the dedicated sniffer network.

In Example 5, the subject matter of any one or more of Examples 1-4 optionally include wherein the sniffer edge circuitry is further configured to transmit the timestamped logs in real time.

In Example 6, the subject matter of any one or more of Examples 1-5 optionally include wherein the sniffer edge circuitry is further configured to transmit the timestamped logs in response to a received request signal.

In Example 7, the subject matter of any one or more of Examples 1-6 optionally include wherein the timestamp is in absolute time.

In Example 8, the subject matter of any one or more of Examples 1-7 optionally include wherein the sniffer edge circuitry is further configured to detect a signal direction in a non-directional mode of operation and then switch to a directional mode of operation once the signal is detected.

In Example 9, the subject matter of Example 8 optionally includes wherein the non-directional mode of operation is a pseudo-omni mode that sweeps between sectors continuously.

In Example 10, the subject matter of any one or more of Examples 8-9 optionally include wherein the timestamp has microsecond resolution.

In Example 11, the subject matter of any one or more of Examples 1-10 optionally include wherein the apparatus is further configured to switch to a sniffer concentrator apparatus, comprising: memory; and processing circuitry, configured to: implement a first network control protocol (NCP) MAC layer of the apparatus configured to handle MAC layer communications of the first NCP; and sniffer concentrator circuitry configured to: generate a common time reference; distribute the common time reference to a plurality of sniffer edges over a dedicated sniffer network; receive time-stamped captured events from the plurality of sniffer edges over the dedicated sniffer network; and store the time-stamped captured events in the memory.

In Example 12, the subject matter of Example 11 optionally includes wherein the sniffer concentrator circuitry is further configured to combine a plurality of the received time-stamped captured events into a unified log in which the timestamped communication events are chronologically sequenced.

Example 13 is an apparatus of a wireless network device, the apparatus comprising: memory; and processing circuitry, configured to: implement a first network control protocol (NCP) MAC layer of the apparatus configured to handle MAC layer communications of the first NCP; and sniffer concentrator circuitry configured to: generate a common time reference; distribute the common time reference to a plurality of sniffer edges over a dedicated sniffer network; receive time-stamped captured events from the plurality of sniffer edges over the dedicated sniffer network; and store the time-stamped captured events in the memory.

In Example 14, the subject matter of Example 13 optionally includes wherein the sniffer concentrator circuitry is further configured to combine a plurality of the received time-stamped captured events into a unified log in which the timestamped communication events are chronologically sequenced.

Example 15 is an apparatus of an integrated wireless network device, the apparatus comprising: memory; and processing circuitry, configured to: implement a first network control protocol (NCP) MAC layer of the apparatus configured to handle MAC layer communications of the first NCP; and sniffer edge circuitry configured to communicate with the first NCP MAC layer and a second NCP MAC layer of the apparatus, to capture events related to second NCP communications, and to communicate the captured events over a dedicated sniffer network, wherein packet contents communicated between the second NCP MAC layer and the second NCP stack are secure from the sniffer edge circuitry.

In Example 16, the subject matter of Example 15 optionally includes ad WiGig protocol.

In Example 17, the subject matter of any one or more of Examples 15-16 optionally include wherein the sniffer edge module is configured to strip information from the captured events before they are communicated over the dedicated sniffer network.

In Example 18, the subject matter of any one or more of Examples 15-17 optionally include processing circuitry to: implement the second NCP MAC layer to handle MAC layer communications of the second NCP, wherein the first NCP MAC and the second NCP MAC are separate from one another; and implement a second NCP stack configured to communicate with the second NCP MAC layer and to handle external high-level wireless communications of the second NCP to and from the apparatus.

Example 19 is a system comprising means to perform any of the methods of Examples 9-16.

Example 20 is a method for operating a sniffer apparatus, comprising: receiving a distributed common time reference from a sniffer concentrator over a dedicated sniffer network using a first network control protocol (NCP) of the apparatus; receiving communication events from a wireless link that utilizes a second NCP of the apparatus that is different from the first NCP; time-stamping, using a processor of the apparatus, the received communication events to enable synchronization of the communication events by the sniffer concentrator; storing the time-stamped communication events in a memory of the apparatus; transmitting, over the dedicated sniffer network, the stored time-stamped communication events to the sniffer concentrator.

In Example 21, the subject matter of Example 20 optionally includes timestamping, in absolute time, communication events received based on the distributed common time reference.

In Example 22, the subject matter of Example 21 optionally includes transmitting timestamped logs comprising the timestamped communication events to the sniffer concentrator over the dedicated sniffer network.

In Example 23, the subject matter of Example 22 optionally includes wherein the transmitting of the timestamped logs occurs in real time.

In Example 24, the subject matter of any one or more of Examples 22-23 optionally include wherein the transmitting of the timestamped logs occurs in response to a received request signal.

In Example 25, the subject matter of any one or more of Examples 20-24 optionally include switching to a sniffer concentrator mode of operation; creating a distributed common time reference; transmitting the distributed common time reference to a plurality of sniffer edges over the dedicated sniffer network; receiving, over the dedicated sniffer network, a plurality of time-stamped communication events from the plurality of sniffer edges; and storing the received time-stamped communication events in the memory.

In Example 26, the subject matter of Example 25 optionally includes combining, by the sniffer apparatus operating in the sniffer concentrator mode, the plurality of time-stamped communication events into a unified log in which the timestamped communication events are chronologically sequenced.

In Example 27, the subject matter of any one or more of Examples 20-26 optionally include ad WiGig network.

Example 28 is a computer program product comprising one or more tangible computer readable non-transitory storage media comprising computer-executable instructions operable to, when executed by processing circuitry of a device, configure the station to perform any of the methods of Examples 20-27.

Example 29 is a computer program product comprising one or more tangible computer readable non-transitory storage media comprising computer-executable instructions operable to, when executed by processing circuitry of a device, configure the device to: implement a first network control protocol (NCP) MAC layer of an apparatus configured to handle MAC layer communications of the first NCP; and utilize sniffer edge circuitry to: communicate with the first NCP MAC layer and a second NCP MAC layer of the apparatus, to capture events related to second NCP communications; communicate the captured events over a dedicated sniffer network, wherein packet contents communicated between the second NCP MAC layer and the second NCP stack are secure from the sniffer edge circuitry; receive a distributed common time reference from a sniffer concentrator during an initialization of the sniffer edge circuitry; and timestamp the captured events based on the received distributed common time reference to enable synchronization of the captured events by the sniffer concentrator.

In Example 30, the subject matter of Example 29 optionally includes wherein the instructions are further operable to utilize the sniffer edge circuitry to transmit timestamped logs comprising the timestamped captured events to a sniffer concentrator over the dedicated sniffer network.

Example 31 is an apparatus of a wireless network devices, comprising: means for receiving a distributed common time reference from a sniffer concentrator over a dedicated sniffer network using a first network control protocol (NCP) of the apparatus; means for receiving communication events from a wireless link that utilizes a second NCP of the apparatus that is different from the first NCP; means for time-stamping, using a processor of the apparatus, the received communication events to enable synchronization of the captured events by the sniffer concentrator; means for storing the time-stamped communication events in a memory of the apparatus; means for transmitting, over the dedicated sniffer network, the stored time-stamped communication events to the sniffer concentrator.

In Example 32, the subject matter of Example 31 optionally includes means for timestamping, in absolute time, communication events received based on the distributed common time reference.

In Example 33, the subject matter of Example 32 optionally includes means for transmitting timestamped logs comprising the timestamped communication events to the sniffer concentrator over the dedicated sniffer network.

In Example 34, the subject matter of Example 33 optionally includes wherein the transmitting of the timestamped logs occurs in real time.

In Example 35, the subject matter of any one or more of Examples 33-34 optionally include wherein the transmitting of the timestamped logs occurs in response to a received request signal.

In Example 36, the subject matter of any one or more of Examples 31-35 optionally include means for switching to a sniffer concentrator mode of operation; means for creating a distributed common time reference; means for transmitting the distributed common time reference to a plurality of sniffer edges over the dedicated sniffer network; means for receiving, over the dedicated sniffer network, a plurality of time-stamped communication events from the plurality of sniffer edges; and means for storing the received time-stamped communication events in the memory.

In Example 37, the subject matter of Example 36 optionally includes means for combining, by the sniffer apparatus operating in the sniffer concentrator mode, the plurality of time-stamped communication events into a unified log in which the timestamped communication events are chronologically sequenced.

In Example 38, the subject matter of any one or more of Examples 31-37 optionally include ad WiGig network.

The invention claimed is:

1. An apparatus of a wireless network device, the apparatus comprising:
   memory;
   a clock;
   processing circuitry, configured to:
   implement a first network control protocol (NCP) MAC layer of the apparatus configured to handle MAC layer communications of the first NCP; and
   sniffer edge circuitry configured to:
   communicate with the first NCP MAC layer and a second NCP MAC layer of the apparatus, to capture events related to second NCP communications;
   communicate the captured events over a dedicated sniffer network including at least two sniffer edge apparatuses and a sniffer concentrator, wherein packet contents communicated between the second NCP MAC layer and the second NCP stack are secure from the sniffer edge circuitry;
   receive a distributed common time reference from the sniffer concentrator during an initialization of the sniffer edge circuitry, the distributed common time reference provided to each of the at least two sniffer edge apparatuses;
   synchronize the clock to the common time reference; and
   timestamp the captured events using the synchronized clock to enable synchronization of the captured events by the sniffer concentrator.

2. The apparatus of claim 1, wherein the second NCP communications are IEEE 802.11ad WiGig communications, and the dedicated sniffer network is a network other than an IEEE 802.11ad WiGig network.

3. The apparatus of claim 2, wherein the network other than the IEEE 802.11ad WiGig network is a Wi-Fi network.

4. The apparatus of claim 1, wherein the sniffer edge circuitry is further configured to transmit timestamped logs comprising the timestamped captured events to a same or different sniffer concentrator over the dedicated sniffer network.

5. The apparatus of claim 1, wherein the sniffer edge circuitry is further configured to transmit the timestamped logs in real time.

6. The apparatus of claim 1, wherein the sniffer edge circuitry is further configured to transmit the timestamped logs in response to a received request signal.

7. The apparatus of claim 1, wherein the timestamp is in absolute time.

8. The apparatus of claim 1, wherein the sniffer edge circuitry is further configured to detect a signal direction in a non-directional mode of operation and then switch to a directional mode of operation once the signal is detected.

9. The apparatus of claim 8, wherein the non-directional mode of operation is a pseudo-omni mode that sweeps between sectors continuously.

10. The apparatus of claim 8, wherein the timestamp has microsecond resolution.

11. The apparatus of claim 1, wherein the apparatus is further configured to switch to a sniffer concentrator apparatus, comprising:
    memory; and processing circuitry, configured to:
    implement a first network control protocol (NCP) MAC layer of the apparatus configured to handle MAC layer communications of the first NCP; and
    sniffer concentrator circuitry configured to:
    generate the common time reference;
    distribute the common time reference to the at least two sniffer edge apparatuses over a dedicated sniffer network;
    receive time-stamped captured events from the at least two sniffer edge apparatuses over the dedicated sniffer network; and
    store the time-stamped captured events in the memory.

12. The apparatus of claim 11, wherein the sniffer concentrator circuitry is further configured to combine a plurality of the received time-stamped captured events into a unified log in which the timestamped communication events are chronologically sequenced.

13. An apparatus of a wireless network device, the apparatus comprising:
    memory; and
    processing circuitry configured to:
    implement a first network control protocol (NCP) MAC layer of the apparatus configured to handle MAC layer communications of the first NCP; and
    sniffer concentrator circuitry configured to:
    generate a common time reference;
    distribute the common time reference to a plurality of sniffer edges over a dedicated sniffer network;
    receive time-stamped captured events from the plurality of sniffer edges over the dedicated sniffer network, a time stamp of the time-stamped captured events from a respective clock synchronized to the common time reference; and
    store the time-stamped captured events in the memory.

14. The apparatus of claim 13, wherein the sniffer concentrator circuitry is further configured to combine a plurality of the received time-stamped captured events into a unified log in which the timestamped communication events are chronologically sequenced.

15. An apparatus of an integrated wireless network device, the apparatus comprising:
    memory;
    processing circuitry configured to:
    implement a first network control protocol (NCP) MAC layer of the apparatus configured to handle MAC layer communications of the first NCP; and
    sniffer edge circuitry configured to communicate with the first NCP MAC layer and a second NCP MAC layer of the apparatus, to capture events related to second NCP communications, and to communicate the captured events over a dedicated sniffer network, wherein packet contents communicated between the second NCP MAC layer and the second NCP stack are secure from the sniffer edge circuitry; and wherein the sniffer edge circuitry is further configured to detect a signal direction in a non-directional mode of operation and then switch to a directional mode of operation once the signal is detected.

16. The apparatus of claim 15, wherein the second NCP is an IEEE 802.11ad WiGig protocol, and the first NCP is a protocol other than an IEEE 802.11ad WiGig protocol.

17. The apparatus of claim 15, further comprising processing circuitry to:

implement the second NCP MAC layer to handle MAC layer communications of the second NCP, wherein the first NCP MAC and the second NCP MAC are separate from one another; and implement a second NCP stack configured to communicate with the second NCP MAC layer and to handle external high-level wireless communications of the second NCP to and from the apparatus.

18. A method for operating a sniffer apparatus, comprising:

receiving a distributed common time reference from a sniffer concentrator over a dedicated sniffer network using a first network control protocol (NCP) of the apparatus;

synchronizing a clock of the sniffer apparatus based on the distributed common time reference;

receiving communication events from a wireless link that utilizes a second NCP of the apparatus that is different from the first NCP;

time-stamping, based on the synchronized clock and using a processor of the apparatus, the received communication events to enable synchronization of the communication events by the sniffer concentrator;

storing the time-stamped communication events in a memory of the apparatus;

transmitting, over the dedicated sniffer network, the stored time-stamped communication events to the sniffer concentrator.

19. The method of claim 18, further comprising:

timestamping, in absolute time, communication events received based on the distributed common time reference.

20. The method of claim 19, further comprising:

transmitting timestamped logs comprising the time-stamped communication even to the sniffer concentrator over the dedicated sniffer network.

21. The method of claim 18, further comprising:

switching to a sniffer concentrator mode of operation;

creating the distributed common time reference;

transmitting the distributed common time reference to a plurality of sniffer edges over the dedicated sniffer network;

receiving, over the dedicated sniffer network, a plurality of time-stamped communication events from the plurality of sniffer edges; and storing the received time-stamped communication events in the memory.

22. The method of claim 21, further comprising:

combining, by the sniffer apparatus operating in the sniffer concentrator mode, the plurality of time-stamped communication events into a unified log in which the timestamped communication events are chronologically sequenced.

23. The method of claim 18, wherein the second NCP communications are IFEE 802.11ad WiGig communications, and the dedicated sniffer network is a network other than an H-EE 802.11ad WiGig network.

24. A computer program product comprising one or more tangible computer readable non-transitory storage media comprising computer-executable instructions operable to, when executed by processing circuitry of a device, configure the device to:

implement a first network control protocol (NCP) MAC layer of an apparatus configured to handle MAC layer communications of the first NCP; and utilize sniffer edge circuitry to:

communicate with the first NCP MAC layer and a second NCP MAC layer of the apparatus, to capture events related to second NCP communications;

communicate the captured events over a dedicated sniffer network, wherein packet contents communicated between the second NCP MAC layer and the second NCP stack are secure from the sniffer edge circuitry;

receive a distributed common time reference from a sniffer concentrator during an initialization of the sniffer edge circuitry;

synchronize a clock of the device to the common time reference; and timestamp, using the synchronized clock, the captured events based on the received distributed common time reference to enable synchronization of the captured events by the sniffer concentrator.

25. The computer program product of claim 24, wherein the instructions are further operable to utilize the sniffer edge circuitry to transmit timestamped logs comprising the time-stamped captured events to a sniffer concentrator over the dedicated sniffer network.

* * * * *

UNITED STATES PATENT AND TRADEMARK OFFICE
CERTIFICATE OF CORRECTION

PATENT NO. : 10,397,090 B2
APPLICATION NO. : 15/392558
DATED : August 27, 2019
INVENTOR(S) : Glik et al.

Page 1 of 1

It is certified that error appears in the above-identified patent and that said Letters Patent is hereby corrected as shown below:

In the Claims

In Column 15, Line 47, in Claim 20, delete "even" and insert --events-- therefor In Column 16, Line 17, in Claim 23, delete "IFEE" and insert --IEEE-- therefor In Column 16, Line 19, in Claim 23, delete "H-EE" and insert --IEEE-- therefor Signed and Sealed this
Thirty-first Day of March, 2020

Andrei Iancu
*Director of the United States Patent and Trademark Office*